United States Patent
Jimenez-Flores et al.

(10) Patent No.: US 9,907,330 B2
(45) Date of Patent: Mar. 6, 2018

(54) FOOD PRODUCT HAVING HIGH MILK PROTEIN CONTENT AND PROCESS OF MAKING SAME

(71) Applicant: Cal Poly Corporation, San Luis Obispo, CA (US)

(72) Inventors: Rafael Jimenez-Flores, San Luis Obispo, CA (US); Andrea M Laubscher, Paso Robles, CA (US)

(73) Assignee: Cal Poly Corporation, San Luis Obispo, CA (US)

( * ) Notice: Subject to any disclaimer, the term of this patent is extended or adjusted under 35 U.S.C. 154(b) by 81 days.

(21) Appl. No.: 14/815,062

(22) Filed: Jul. 31, 2015

(65) Prior Publication Data
US 2016/0029645 A1    Feb. 4, 2016

Related U.S. Application Data

(60) Provisional application No. 62/032,537, filed on Aug. 2, 2014.

(51) Int. Cl.
| | | |
|---|---|---|
| *A21D 13/00* | (2017.01) | |
| *A23L 33/19* | (2016.01) | |
| *A23L 29/212* | (2016.01) | |
| *A23L 7/13* | (2016.01) | |
| *A23L 33/115* | (2016.01) | |

(52) U.S. Cl.
CPC ............ *A23L 33/19* (2016.08); *A23L 7/13* (2016.08); *A23L 29/212* (2016.08); *A23L 33/115* (2016.08); *A23V 2002/00* (2013.01)

(58) Field of Classification Search
CPC ........... A23L 29/212; A23L 33/19; A23L 7/13

USPC ................................................ 426/560, 583
See application file for complete search history.

(56) References Cited

U.S. PATENT DOCUMENTS

| | | |
|---|---|---|
| 4,009,291 A | 2/1977 | Mitchell et al. |
| 4,239,784 A | 12/1980 | Guiraud et al. |
| 4,550,028 A * | 10/1985 | Montigny ............ A23C 9/1512 426/39 |
| 5,006,349 A | 4/1991 | Dahlstrom et al. |

(Continued)

FOREIGN PATENT DOCUMENTS

WO    2011064241 A1    6/2011

OTHER PUBLICATIONS

Jimenez-Flores, Rafael et al. "A Comparison of the Effects of a High Carbohydrate vs. a Higher Protein Milk Supplement Following Simulated Mountain Skirmishes", Military Medicine, 177, 6:723, 2012.

(Continued)

*Primary Examiner* — Lien T Tran
(74) *Attorney, Agent, or Firm* — McKee, Voorhees & Sease, PLC

(57) ABSTRACT

A food product and process of making the same is provided which results in a high milk protein product having 10% to 25% milk protein content, higher phospholipids compared to unadulterated cow milk, a casein to whey ration of at least 50:50 and is shelf stable for at least six months. In the process whole milk and at least one milk protein source is mixed, heated and contacted with an acid or acidulating substance and co-precipitated to produce a semi-solid precipitate. The precipitate is mixed with starch and cooked.

18 Claims, 4 Drawing Sheets
(3 of 4 Drawing Sheet(s) Filed in Color)

(56) References Cited

U.S. PATENT DOCUMENTS

| | | | |
|---|---|---|---|
| 5,162,941 | A | 11/1992 | Favro et al. |
| 5,714,182 | A * | 2/1998 | Bisson ................. A23C 9/1307 426/34 |
| 6,565,900 | B2 | 5/2003 | Roussel et al. |
| 6,592,925 | B2 | 7/2003 | Drantch et al. |
| 7,247,331 | B2 | 7/2007 | Souppe et al. |
| 7,695,745 | B2 | 4/2010 | Johnston et al. |
| 7,811,620 | B2 | 10/2010 | Merrill et al. |
| 7,829,128 | B2 | 11/2010 | Karwowski et al. |
| 8,080,276 | B2 | 12/2011 | Dybing et al. |
| 8,221,810 | B2 | 7/2012 | Allen et al. |
| 8,263,144 | B2 | 9/2012 | Koka et al. |
| 8,313,788 | B2 | 11/2012 | Licker et al. |
| 8,349,379 | B2 | 1/2013 | Wolfschoon-Pombo et al. |
| 2009/0269458 | A1 | 10/2009 | Miura et al. |
| 2010/0303991 | A1 | 12/2010 | Karwowski et al. |
| 2013/0078313 | A1 | 3/2013 | Rowney et al. |
| 2013/0115344 | A1 | 5/2013 | Konuklar |
| 2014/0017332 | A1 | 1/2014 | Tikanmaki et al. |
| 2014/0024580 | A1 | 1/2014 | Sliwinski et al. |
| 2014/0093617 | A1 | 4/2014 | Hynes et al. |

OTHER PUBLICATIONS

United States Patent and Trademark Office, PCT/ISA, "PCT International Search Report and Written Opinion", issued in relation to PCT Application No. PCT/US2015/43183, dated Dec. 22, 2015, 9 pages.

* cited by examiner

FOOD PRODUCT HAVING HIGH MILK PROTEIN CONTENT AND PROCESS OF MAKING SAME

REFERENCE TO RELATED APPLICATION

This application claims priority to U.S. Ser. No. 62/032,537, filed Aug. 2, 2014, the contents of which are incorporated herein by reference in its entirety.

BACKGROUND

High protein food products are useful in a variety of settings. One example is with products consumed by athletes building muscle mass, or where a person suffers from lean body mass loss due to illness or excessive physical activity. In one example a food product is useful for soldiers who need a transportable stable protein source while in the field. Consuming protein can enhance muscle mass and strength. See Jimenez-Flores et al. "A comparison of the effects of a high carbohydrate vs. a higher protein milk supplement following simulated mountain skirmishes" *Military Medicine* 177 6:723, 2012.

SUMMARY

The product and process described here relate to a shelf stable food product having at least 10% milk protein by dry weight, which may be in an embodiment have up to 25% milk protein by dry weight. The process mixes milk and a milk protein source. The food product may have at least 20% increased phospholipids compared to the phospholipid content of the milk, which can increase after mixing with a milk protein source. In an embodiment lactose content is decreased by at least 70% compared to the milk used at the start of the process. An embodiment provides the food product is a chip. The process to produce the food product includes mixing milk and a milk protein source, such as a milk by-product, such that the casein to whey ratio is at least 50:50, and in an embodiment is 80:20. The mix is co-precipitated, heated and combined with acid or an acid-producing source to produce a semisolid precipitate. The precipitate is mixed with starch so that the milk protein content of the final food product is at least 10% by dry weight, and in a preferred embodiment is 10% to 25% of the food product by dry weight. The precipitate and starch is homogenously mixed, and then may be cooked. The resulting food product has a high amount of high quality protein, is shelf stable and palatable.

DESCRIPTION OF THE DRAWINGS

The patent or application file contains at least one drawing executed in color. Copies of this patent or patent application publication with color drawing(s) will be provided by the Office upon request and payment of the necessary fee.

DESCRIPTION

Figure 1:
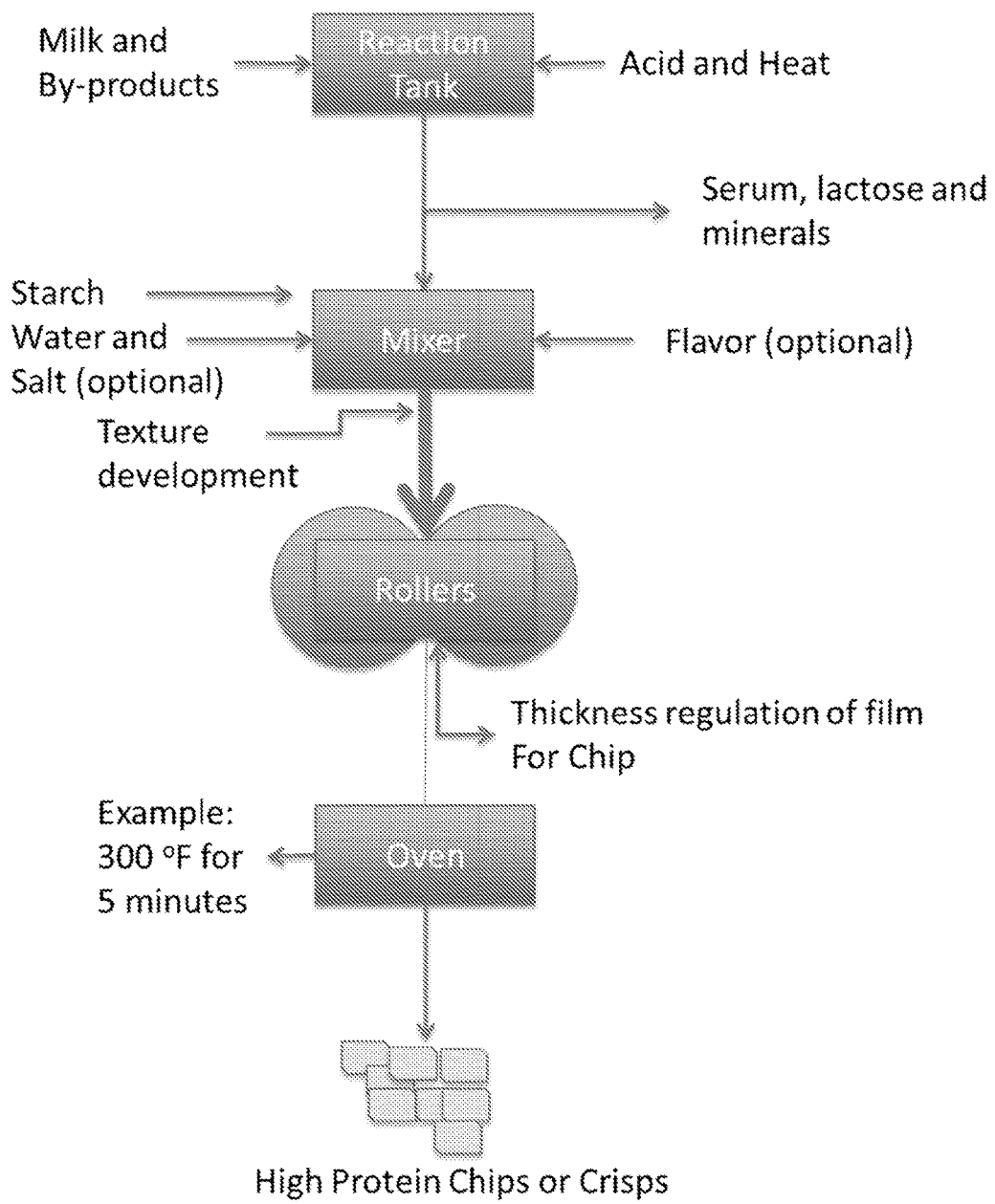
FIG. 1 is a block diagram showing an embodiment of the process of producing the food product.

The present process and product relates to a shelf stable food product that has an increased amount of high quality protein, where the high quality protein is milk protein, having at least 10% milk protein by dry weight, combined with starch. A preferred embodiment provides the product has at least 10% up to 25% milk protein. An embodiment provides the product has increased phospholipids compared to the milk phospholipid content prior to mixing with the milk source product. In a preferred embodiment the product has at least 20% increased amount of phospholipids. Still further embodiments provide the product has reduced lactose compared to the mixed milk, and a preferred embodiment provides the lactose is reduced by at least 70%. An embodiment provides the product is formed into a chip (sometimes called a crisp) and cooked, is shelf stable, has high quality protein in the form of milk protein of at least 10% by dry weight. Milk provides a higher quality of protein compared to most other sources, in that it contains all nine essential amino acids required by humans. The food product is palatable and has a milk and cheese-like flavor that may be easily enhanced by the addition of other flavorings.

The process of producing the product combines milk, which preferably is whole milk, with a milk protein source, which milk protein source in a preferred embodiment is buttermilk, whey or pro-cream. If the by-product is provided in the form of a powder, it may be re-hydrated. The mixture is heated. An embodiment provides the mixture is heated to at least 195° F. and in a preferred embodiment heated to 195° F. to 212° F. The mixture is contacted with an acid and co-precipitated to produce a semi-solid precipitate. An embodiment provides that liquid (serum) from the semi-solid precipitate is removed and a preferred embodiment provides the liquid is removed such that at least some lactose is removed with the liquid. A further preferred embodiment provides that at least 70% of the lactose is removed with the whey. Lactose from the original milk is reduced by virtue of separation of the solid fraction resulting from the process of applying heat and acid and includes the lipid fraction of the whole milk. Therefore the typical range of lactose removed is in the range of 50 to 75% removal of lactose.

The semi-solid precipitate will in a preferred embodiment have at least 30% solids after the liquid is removed and in another embodiment at least 35% solids after liquid is removed.

The resulting precipitate is mixed with a starch. An embodiment provides the starch is one which has a low amount of reducing sugars in order to reduce browning. Yet another embodiment provides the starch and precipitate is mixed to produce a homogenous dough-like mixture. A preferred embodiment provides the starch is homogenously dispersed in the precipitate to produce a dough-like mixture capable of being rolled. Still further embodiments provide the dough-like mixture may be rolled into a sheet of desired thickness and in other embodiments formed into a shape. The dough-like mixture is then baked. A preferred embodiment provides for production of a chip or crisp. The process provides for a simple and inexpensive means of producing a food product having high amounts of high quality protein which is self-stable, has good organoleptic properties, being palatable with a pleasing flavor, easily transported and stored. In an embodiment, heating milk and buttermilk produced a product in which droplets of fat had a film of protein surrounding. The result in one embodiment is a chip or food product that is not oily, contains high quality protein, is crunchy, without rancid or sour flavor, and is stable without oxidation or becoming rancid over six months and more.

By way of further illustration, the process uses milk as a source of milk protein. When referring to milk is meant to include milk provided in different forms, such as liquid, powder, or concentrate. The milk can be produced from various species of dairy animal, such as cow, buffalo, camel, sheep, goat and yak, for instance. Economic considerations in a preferred embodiment favor the use of cow or buffalo or goat milk, as obtaining large quantities of cow goat or buffalo milk is less expensive. A preferred embodiment provides the milk is from cows. The milk may or may not be pasteurized. The milk is, in a preferred embodiment, whole milk, and in its optimal form, milk that has been standardized for fat content but does not need to be homogenized. Since whole milk has no constituent removed it is also expected to be less expensive to use, by foregoing further processing and related costs. Whole milk from cow, by way of example, commonly has about 3-5% fat, in certain instances up to about 6% fat, about 5% lactose (carbohydrate), on average about 3.3% protein, less than 1% or about 0.7% minerals, and over 85% or about 87-88% water. It is to be emphasized this is an example of the composition of whole cow's milk and there can be variation, especially depending upon the breed of cow, stage of lactation and feed provided. For example, milk from *Bos inducus* has fat content of as much as 5.5% compared to *Bos taurus*. There are two major categories of milk protein, the casein proteins which contain phosphorous, and serum or whey proteins which do not have phosphorus. Casein precipitates at pH of about 4.6, where whey remains in solution at this pH. In cow's milk about 80-82% of milk protein is casein and about 18-20% is whey protein. When referring to unadulterated milk is meant milk that has not had constituents removed, nor any adjustment to the casein and whey ratio.

The milk is combined with a milk protein source, which in an embodiment is a milk by-product. The by-product here is a product of commercial value produced during the manufacture of a main product. Milk by-products here refer to components separated from milk, whether by culturing, straining or the like. By way of example, without limitation, buttermilk is the liquid that remains after butterfat has been removed from whole milk or cream, or when culturing milk; whey or milk serum is produced during cheese production and is the liquid separated when milk is curdled and strained; whey cream is cream removed from whey; and pro-cream is a whey by-product of concentration. Other by-products would include caseinates, milk protein concentrates, including whey protein concentrate and whey protein isolate. The milk protein source may be in any convenient form, whether liquid, powdered or concentrated, for example. The milk and milk protein source are combined to maintain the proportion of casein to whey that is at least 50% casein and 50% whey. In a preferred embodiment the ratio of casein to whey of the mixture is similar to that of the unadulterated milk, and in a preferred embodiment is about 80-82% casein and 18-20% whey. This addition of milk protein source increases the proportion of phospholipids and in an embodiment increases the amount of phospholipids to at least 20% more in dry weight than the milk used to combine with the milk protein source. The final co-precipitate for this product in an embodiment may have an equivalent amount of phospholipids found in whole milk and any increased increment of milk phospholipids. The milk and milk protein source are mixed and may or may not be homogenized before or after mixing.

Mixing of milk with the milk protein source can be made in various proportions to achieve the desired amount of protein in the final food product which may be a chip or crisp product. However, the amount of dairy by-product containing phospholipids in an embodiment will be taken into consideration. For example, if buttermilk that is naturally richer in phospholipids than regular milk is used, it may contain up to 10 times more phospholipids than milk. By way of example without limitation, it may be assumed milk has about 1% phospholipids and buttermilk about 10% phospholipids. Thus to achieve an enrichment of 20% over whole milk, the final mix should have about 1.2% phospholipids. This can be achieved by mixing 97.7% milk with 2.3% buttermilk.

The milk and milk protein source are then heated to a temperature of at least 195° F. up to 212° F. and an acid added or an acidulating substance, where, for example, the source of acidification may be a starter bacteria. In an embodiment the milk and milk protein source is heated from about 10 to 15 to 25 minutes before or during acidification. If acidification occurs during or after heating, the mixture is exposed to the acid for at least 10 minutes, and in an embodiment from about 10 to 25 minutes. An embodiment provides the pH is from about 4.60 to 4.45 after addition of the acid. The acid may be any nontoxic acid and in a preferred embodiment is a food grade acid such as lactic acid, citric acid, acetic acid or the like, or a combination. This provides for co-precipitation of the mixture and maximum recovery of protein from the liquid mix into a semisolid precipitate that contains the protein and fat of the original mix.

The inventors found this heating process retains much of the whey proteins. In an embodiment, as little as 0.5-1% of whey protein is lost.

The resulting semisolid precipitate may in an embodiment be separated from the remaining serum. It may be desirable to decrease lactose, as it is a reducing sugar. Most lactose will not precipitate and in removing the serum typically about 70%-80% of the lactose is removed with the serum. Examples of the variety of processes which are available to one skilled in the art for removing the serum include pressing, draining or moving the solids through a filter, such as a membrane, cheesecloth or mold, centrifugation and draining. A preferred embodiment provides that the serum is reduced by a process which favors removal of lactose with the serum. By way of example without limitation, reverse osmosis can remove most of the milk water, where filtration and such processes as ultrafiltration allow lactose to pass through the membrane, as well as any molecule having a molecular weight lower than 10,000 for ultrafiltration, and as high as 300,000 for lower limits of microfiltration. Addition of water can remove even more lactose, and is commonly called "diafiltration". The method used to separate the serum, and to increase the amount of lactose separated with the serum is not critical and any convenient method may be employed.

The final composition of the mass of milk solids will in an embodiment be 30% to 55% solids and a further embodiment provides the solids have a pH of about 4.60 to 4.40, with a preferred embodiment providing for a pH of 4.50.

The milk solids are combined with a starch. Any starch useful for a food product may be used. By way of example without limitation, the starch can be obtained from wheat, tapioca, quinoa, corn, sorghum, potato, sweet potato or rice, as common examples. In an embodiment a gluten free food product may be made from a starch not containing gluten. The starch can be any convenient form, such as granules, flour, flakes or any other useful form. In one example the starch is provided in the form of a flour which may be mixed with the milk solids and any other desired ingredients. It is understood the form of the starch, whether granules, flour, flakes or other form may include other parts of the starch source, such as flour produced from whole seed or grain, the entire tuber or the like. In one example flour may be produced from whole seed or from potato tuber. Thus the starch provided may take many forms.

Starch consists of a large number of glucose units which are bonded by glycosidic bonds. Potato starch, for example, contains an enzyme that breaks down the starch and produces more reducing sugars. Reducing sugars are open chain forms with an aldehyde group or free hemiacetal group. Monosaccharides are single sugar units such as glucose and galactose, where disaccharides have two monosaccharides such as lactose and maltose. Reducing sugars such as these mono- and disaccharides in starch when mixed with protein and heat can result in browning of the mixture through Maillard reaction. As such browning may be undesirable, in an embodiment starch having lower amounts of reducing sugars compared to its' unmodified state is desirable. A person skilled in the art appreciates there are a variety of methods and sources to obtain a starch having decreased reducing sugars compared to unmodified forms of the starch, and also where there are little or no reducing sugars present. Starches with lower dextrose equivalent, measuring the amount of reducing sugars compared to dextrose as a percent of dry mass, are readily available. For example, see Mitchell et al., U.S. Pat. No. 4,009,291 discussing low dextrose equivalent starches of 20 to 43 D.E., 5 to 18 D.E. and improvement of qualities of starches subjected to hydrolysis and which have a dextrose equivalent of less than 1. Such starches may come at an increased price, however, and the degree of lowered reducing sugars in a particular starch must be balanced with the price, to achieve the desired avoidance of browning at a practical cost. By way of example, such starches are available from a variety of food product companies, including Penford Corporation (Penford Food Ingredients), 1088 W Sunnyside Road, Idaho Falls Id. (penford.com) and Potato Brokerage, 639 S 50 W, Burley Id.

In one embodiment, the starch used is potato starch. This may be desirable in producing a food product familiar to those who consume potato chips.

The starch is added to the solids with a food product resulting having:

1) milk protein content of 10% to 25% of dry weight of the final product and 2) casein to whey ratio of at least 50:50 by dry weight and which in certain embodiments may be up to about 82:18 and 3) where a dough-like mixture capable of being formed into the desired shape is produced which results in the food product.

One skilled in the art will appreciate that the amount of starch to add will be dependent on the amount of milk protein. Starch will dilute the milk protein content, and moisture and other factors will impact the balance. While the amount of milk protein content of the semisolid precipitate will vary, typically the milk protein content is about 32%-35% protein. The starch is mixed with the precipitate such that the mixture has a protein content of at least 10%. The protein content in an embodiment may be 10%, 11%, 12%, 13%, 14%, 15%, 16%, 17%, 18%, 19%, 20%, 21%, 22%, 23%, 24%, 25%. An embodiment provides that the amount of milk protein content in the starch and precipitate mixture is such that it does not form a cheese. In a further embodiment the amount of milk protein content of the mixture does not exceed 25% dry weight. By way of example, without limitation, the amount of casein to starch ratio may be 50:50; 55:45; 60:40; 65:35; 70:30, 80:20 or any amount in-between.

| Table exemplifying the ranges of amounts for production | | | |
|---|---|---|---|
| Percent milk protein content in semisolid precipitate | Range of moisture content of precipitate | Range of percent milk protein content desired in end product | Range of amount of starch to add |
| 32%-45% | 30%-55% | 10%-25% | 35% to 75% |

Water and salt are optionally added as needed to result in a mass that is preferably malleable. An embodiment provides that this mass be mixed such that there is a homogenous mixture of starch. A further embodiment provides that it is not necessary to extrude the mass to produce a food product. Another provides that it is possible to produce the high protein product without further enrichment from a source other than the milk and milk protein source. It is also in an embodiment not necessary to employ emulsifying salts, used commonly in making milk powder, evaporated milk, or processed cheese. Still further, an embodiment provides the dough-like mass that results is capable of being rolled. The mass will in an embodiment not have large lumps nor visible collections of starch. The protein extends to form a continuous phase of dough entrapping fat globules in one embodiment. In an embodiment, the starch forms a uniform continuous phase along with the protein. The dough-like mass may be formed into any desired shape. The mass is capable of being produced in many geometric forms and thicknesses. In another embodiment the mass is rolled into a sheet and then cut or formed into shapes. A still further embodiment provides the sheet may be cut into the form of chips or crisps. The mass may be cooked to achieve the desired texture and color. One skilled in the art appreciates that when producing a chip food product, there is a wide variety of processes and techniques available and that will become available. See, for example, Karwowski et al., U.S. Pat. No. 7,829,128, discussing examples of forming shapes and cooking such dough-like masses.

When referring to a food product, the product is one that is edible. In an embodiment the product may be used as a food with an animal, whether a human or other animal. In one embodiment the product is edible by a human. In another embodiment the food product is edible by domesticated animals, and is especially useful when provided to such animals that would benefit from a high milk protein food product, such as dogs, cats and the like. The resulting food product has a milk protein content of at least 10% and in an embodiment has milk protein content of 10%-25%. The product in a further embodiment has increased phospholipids compared to the milk used as the starting milk, and in an embodiment has at least 20% higher phospholipids than the milk used in the process. The milk protein of the product includes casein and whey in an amount at least 50% casein and 50% whey, up to at least 82% casein and 18% whey, where in an embodiment the amount of casein and whey is within 5% of the ratio of casein to whey in unadulterated milk used in the process. The product further comprises at least some of the milk lipids and will also comprise starch. Still further embodiments provide the food product has the milk solids of the whole milk, with a decrease in lactose compared to the whole milk. The food product has good organoleptic qualities, and is shelf stable. Shelf stable refers to food products that when stored under ambient conditions (such as 72° F. in typical commercial packaging for such products) are safe for consumption, and remain palatable. The products of the invention are shelf stable for up to six months, seven months, eight months, nine months, ten months, eleven months and up to one year.

The following examples are provided by way of illustration and are not meant to limit the scope of the invention. References including patents and patent applications cited herein are incorporated herein by reference in their entirety.

EXAMPLES

A block diagram of an embodiment of the process of producing the high protein food product is provided in FIG. 1.

Example 1

Manufacturing of high milk protein potato chips.
(Subscripts with i, ii, etc. indicate different experimental trials)
1) Preparation of the milk protein precipitate.
   a. Selection of raw milk.
      i. Whole milk (without standardization % fat expected 3.7-4.8%);
      ii. standardized (3.5% fat). Both kinds have been used.
   b. Addition of buttermilk solids,
      i. using reconstituted buttermilk
      ii. buttermilk concentrate (35% solids). {This addition is made in the range of 5 to 15% of all milk solids in the formulation}.
2) Heating the mix to 95° C.
   i. directly (by injection of culinary quality steam)
   ii. heating in a jacketed tank with steam
3) Addition of acid (Lactic or Citric)
   i. Slow addition (5 ml/min) of acid until the pH of 4.5 is reached
   ii. Addition as the milk fills the tank
4) Gentle agitation until protein precipitation is complete
   a. Cooling for 5 minutes.
5) Separation of the precipitated solids
   i. By decanting whey
   ii. By pouring the milk protein precipitate on to cheese molds
6) Gentle pressing
7) Cooling and packaging in vacuum pack bags, and refrigeration until use.
8) MIX of INGREDIENTS
   a. The milk protein precipitate, the potato starch and salt are mixed to form a very 'plastic' mass or dough
      i. Hand mixing (laboratory scale)
      ii. Using a Cusinart mixer (laboratory scale)
      iii. Using a 'Hobart' mixer (Pilot Plant scale over 3 Kg)
   b. Different amount of water added for optimization of mixing.
9) Rolling of the plastic mass or dough
   a. By hand (laboratory scale)
   b. Using a pasta roller (laboratory scale)
   c. Using a mechanical roller that can be calibrated to different thickness. (Pilot plant scale)
10) Cutting the sheets into strips
11) Baking
    a. In kitchen oven (300° F. for needed time until fully cooked, which was variable)
    b. In pilot plant 'impinging' oven: set for 295° F. for 5 minutes in the conveyor belt.
12) Cool chips, cut into squares and package.

Example 2

Figure 2:
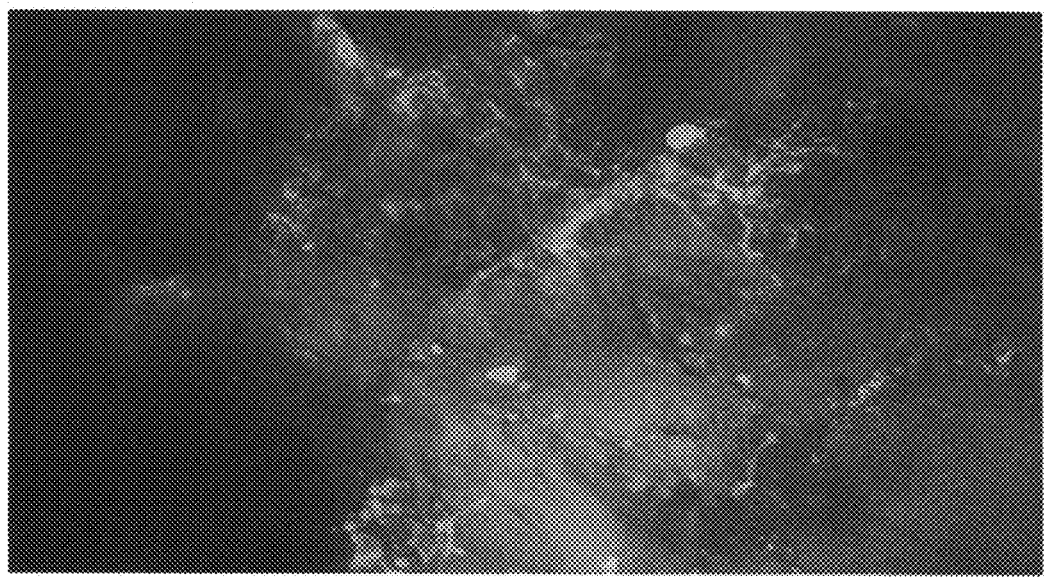
FIG. 2 is a photograph of confocal laser microscopy of a normal non-milk product potato chip. The red color indicates fat and green indicates starch.
Figure 3:
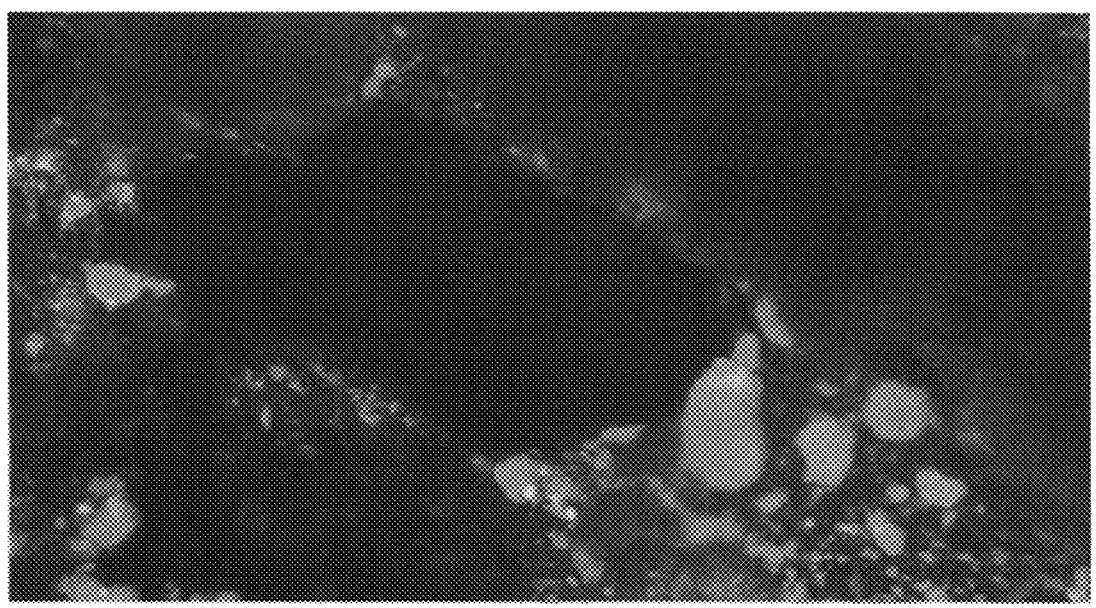
FIG. 3 is a photograph of confocal laser microscopy of a high milk protein chip prepared with whole milk. Red indicates fat and green indicates starch/protein.
Figure 4:
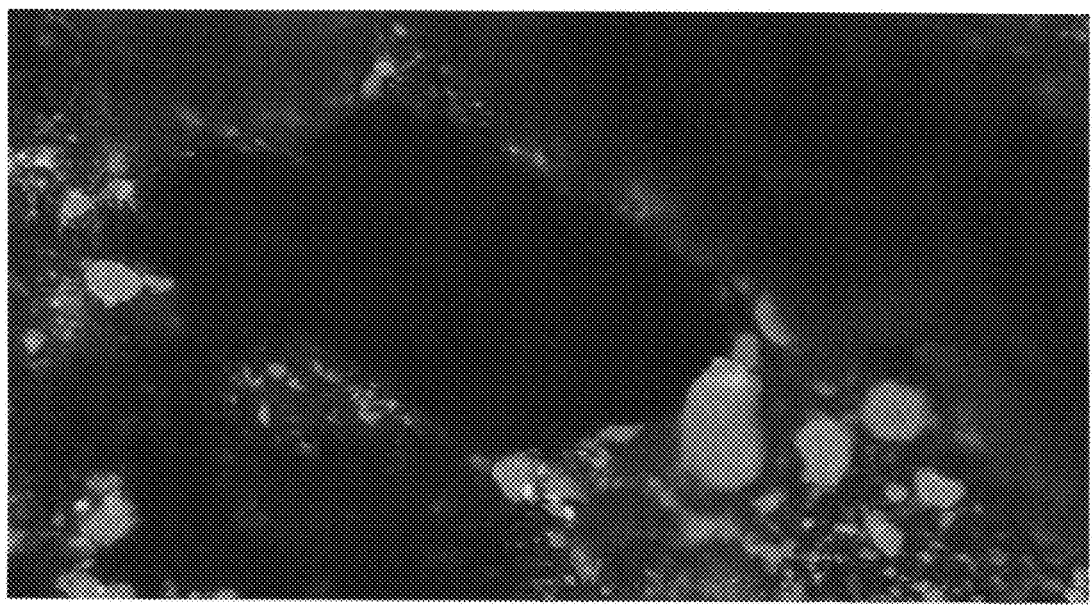
FIG. 4 is a photograph of confocal laser microscopy of a high milk protein chip prepared with whole milk and buttermilk. Red indicates fat, green indicates starch/protein.

The chips made as described above were examined using confocal laser microscopy, where point illumination is used to eliminate any out of focus signal and multiple images obtained to produce three dimensional images. (For example, see U.S. Pat. No. 5,162,941 to a confocal microscope). The control chips produced were made according to the processes described here, but with milk and milk protein source in form of buttermilk not added, and therefore composition of phospholipids lower. Flavor and distribution of fat in the matrix of the chip was improved when buttermilk was added. A normal non-milk product potato chip with about 2.1% protein was examined. Using confocal laser microscopy, it was observed that high proportions of fat in large volumes were present in the chip. (FIG. 2; red indicates fat, green indicates starch.) A high milk protein chip was produced by the procedures outlined above, but using whole milk only and no buttermilk or other milk protein source as a control. Confocal laser microscopy showed that fat is clearly more homogenous throughout the chip, in smaller volumes than the non-milk product chip. A homogenous texture was evidence, where protein engulfs the fat. (FIG. 3, red indicates fat, green indicates starch/protein.) A high milk protein and buttermilk chip was produced according to the process outlined above, with confocal laser microscopy showing that buttermilk completely emulsifies the fat throughout the chip matrix and produces much smaller droplets of fat. (FIG. 4, red indicates fat, green indicates starch/protein).

What is claimed is:

1. A method of producing a food product having high milk protein content, the method comprising,
   a) mixing whole milk and at least one milk protein source comprising buttermilk to form a mixture, wherein said at least one milk protein source increases the phospholipid content of said mixture compared to said whole milk;
   b) acidulating said mixture after or at the same time as heating said mixture to a temperature of 195° F. to 212° F.;
   c) co-precipitating said whole milk and said milk protein source to produce a precipitate;
   d) combining said precipitate with starch to form a dough; and
   e) cooking said dough to produce a food product having at least 10% milk protein content by dry weight and increase phospholipids compared to said whole milk.

2. The method of claim 1, wherein said buttermilk is selected from the group consisting of: liquid buttermilk; buttermilk solids; reconstituted buttermilk and; buttermilk concentrate.

3. The method of claim 1, where said milk protein content of said food product is at least 15% milk protein.

4. The method of claim 1, wherein an amount of lactose of said precipitate is reduced compared to an amount of lactose present in said whole milk and at least one milk protein source.

5. The method of claim 1, wherein said precipitate has at least 20% more phospholipids than said whole milk.

6. The method of claim 1, further comprising separating any serum in said precipitate.

7. The method of claim 1, where the amount of said precipitate and starch is prepared in a ratio of 50:50.

8. The method of claim 1, wherein said whole milk and said milk protein source is combined such that the ratio of casein to whey is at least 50:50.

9. The method of claim 1, wherein said whole milk and milk protein source is combined such that said mixture comprises casein and whey protein, wherein the ratio of said casein to whey protein is at least 50:50 to 82:18.

10. The method of claim 1, wherein said whole milk and milk protein source is combined such that said mixture comprises casein and whey protein, wherein the ratio of said casein to whey protein is within 5% of the ratio of casein to whey in said whole milk.

11. The method of claim 1, wherein said mixture is heated for 10 to 25 minutes.

12. The method of claim 1, wherein said starch is potato starch.

13. The method of claim 1, wherein said food product is a chip.

14. The method of claim 1, further comprising,
a) mixing said whole milk wherein said milk comprises unhomogenized milk and said at least one milk protein source to form a mixture such that the proportion of casein to whey protein is at least 50:50 to at least 82:18;
b) separating any serum from said precipitate;
c) combining said precipitate with starch in a proportion such that the protein content of the food product is at least 10% by dry weight;
d) mixing said starch and said precipitate to form a homogenous dough; and
e) forming said dough into a shape and cooking said dough to produce an edible food product having at least 10% milk protein content by dry weight.

15. The method of claim 1, said method further comprising agitating said mixture under conditions to cause production of said precipitate.

16. The method of claim 1, further comprising combining said precipitate with starch and homogenously dispersing said starch in said precipitate.

17. The method of claim 1, wherein ratio of said casein to whey protein is at least 80:20.

18. The method of claim 1, wherein pH of said mixture is 4.60 to 4.45 after acidulation.

* * * * *